United States Patent
Patil et al.

(10) Patent No.: US 8,341,111 B2
(45) Date of Patent: *Dec. 25, 2012

(54) GRAPH PATTERN RECOGNITION INTERFACE

(75) Inventors: Dhanurjay A. S. Patil, Belmont, CA (US); Grahame Andrew Jastrebski, San Jose, CA (US); Allison E. Miller, Mountain View, CA (US); Chris Riccomini, Saratoga, CA (US)

(73) Assignee: eBay, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/220,209

(22) Filed: Aug. 29, 2011

(65) Prior Publication Data

US 2011/0313960 A1      Dec. 22, 2011

Related U.S. Application Data

(63) Continuation of application No. 11/963,452, filed on Dec. 21, 2007, now Pat. No. 8,046,324.

(60) Provisional application No. 60/991,539, filed on Nov. 30, 2007.

(51) Int. Cl.
    *G06F 15/18* (2006.01)

(52) U.S. Cl. ........... 706/62; 706/12; 706/45; 706/55; 706/13

(58) Field of Classification Search ............ None
    See application file for complete search history.

(56) References Cited

U.S. PATENT DOCUMENTS

| | | |
|---|---|---|
| 5,136,690 A | 8/1992 | Becker et al. |
| 5,577,106 A | 11/1996 | Tanaka et al. |
| 5,596,703 A | 1/1997 | Eick et al. |
| 5,778,178 A | 7/1998 | Arunachalam |
| 5,819,226 A | 10/1998 | Gopinathan et al. |
| 5,950,179 A | 9/1999 | Buchanan et al. |
| 5,963,922 A | 10/1999 | Helmering |
| 5,987,500 A | 11/1999 | Arunachalam |
| 6,032,188 A | 2/2000 | Mairs et al. |
| 6,094,643 A | 7/2000 | Anderson et al. |
| 6,208,720 B1 | 3/2001 | Curtis et al. |
| 6,212,556 B1 | 4/2001 | Arunachalam |
| 6,256,032 B1* | 7/2001 | Hugh .................. 715/854 |
| 6,321,206 B1 | 11/2001 | Honarvar |
| 6,405,173 B1 | 6/2002 | Honarvar et al. |
| 6,430,545 B1 | 8/2002 | Honarvar et al. |
| 6,490,566 B1* | 12/2002 | Schmidt ............... 705/7.26 |
| 6,609,120 B1 | 8/2003 | Honarvar et al. |
| 6,658,393 B1 | 12/2003 | Basch et al. |
| 6,708,155 B1 | 3/2004 | Honarvar et al. |

(Continued)

OTHER PUBLICATIONS

Neal, "Probabilistic inference using markov chain monte carlo methods", Technical Report, Department of Computer Science University of Toronto, 1993, 144 pages.*

"U.S. Appl. No. 09/793,843, Examiner Interview Summary mailed Mar. 17, 2005", 3 pgs.

"U.S. Appl. No. 09/793,843, Final Office Action mailed Feb. 9, 2007", 5 pgs.

(Continued)

*Primary Examiner* — Omar Fernandez Rivas

(74) *Attorney, Agent, or Firm* — Schwegman Lundberg & Woessner, P.A.

(57) ABSTRACT

In some example embodiments, a system and method are illustrated as including receive pattern data that includes transaction data relating to transactions between persons. Next, the system and method may include building at least one secondary network based upon the pattern data. Additionally, the system and method may include displaying the at least one secondary network.

18 Claims, 15 Drawing Sheets

U.S. PATENT DOCUMENTS

| | | | |
|---|---|---|---|
| 6,918,096 B2* | 7/2005 | Hugh | 715/854 |
| 7,464,056 B1 | 12/2008 | Campbell et al. | |
| 7,536,348 B2 | 5/2009 | Shao et al. | |
| 7,558,768 B2* | 7/2009 | Parida | 706/45 |
| 7,626,586 B1* | 12/2009 | Perttunen | 345/440 |
| 8,165,973 B2* | 4/2012 | Alexe et al. | 706/12 |
| 2001/0010730 A1 | 8/2001 | Rhoads | |
| 2001/0037315 A1 | 11/2001 | Saliba et al. | |
| 2001/0037316 A1 | 11/2001 | Shiloh | |
| 2002/0046113 A1 | 4/2002 | Pisano et al. | |
| 2002/0072993 A1 | 6/2002 | Sandus et al. | |
| 2002/0133721 A1 | 9/2002 | Adjaoute | |
| 2003/0036989 A1 | 2/2003 | Bhatia | |
| 2003/0097320 A1 | 5/2003 | Gorden | |
| 2003/0204426 A1 | 10/2003 | Honarvar et al. | |
| 2003/0216984 A1 | 11/2003 | Wang | |
| 2004/0122803 A1 | 6/2004 | Dom et al. | |
| 2004/0148211 A1 | 7/2004 | Honarvar et al. | |
| 2004/0204925 A1* | 10/2004 | Alon et al. | 703/2 |
| 2004/0249866 A1 | 12/2004 | Chen et al. | |
| 2005/0182708 A1 | 8/2005 | Moudgal | |
| 2005/0187881 A1 | 8/2005 | McGiffin et al. | |
| 2005/0188294 A1* | 8/2005 | Kuchinsky et al. | 715/500 |
| 2005/0222929 A1 | 10/2005 | Steier et al. | |
| 2005/0251371 A1 | 11/2005 | Chagoly et al. | |
| 2005/0273820 A1 | 12/2005 | Elberbaum | |
| 2006/0028471 A1 | 2/2006 | Kincaid et al. | |
| 2006/0149674 A1 | 7/2006 | Cook et al. | |
| 2006/0235658 A1* | 10/2006 | Nitta et al. | 703/2 |
| 2006/0235764 A1 | 10/2006 | Bamborough et al. | |
| 2006/0287910 A1 | 12/2006 | Kuchar et al. | |
| 2007/0027662 A1* | 2/2007 | Parida | 703/2 |
| 2007/0033105 A1 | 2/2007 | Collins et al. | |
| 2007/0055662 A1* | 3/2007 | Edelman et al. | 707/6 |
| 2007/0239694 A1* | 10/2007 | Singh et al. | 707/3 |
| 2008/0135612 A1 | 6/2008 | Silbernagl et al. | |
| 2008/0140682 A1 | 6/2008 | Grosset et al. | |
| 2008/0162259 A1 | 7/2008 | Patil et al. | |
| 2009/0122065 A1 | 5/2009 | Patil et al. | |
| 2009/0125543 A1 | 5/2009 | Patil et al. | |
| 2009/0144213 A1 | 6/2009 | Patil et al. | |
| 2009/0234683 A1 | 9/2009 | Anderson et al. | |
| 2010/0005051 A1* | 1/2010 | Agrawal et al. | 706/55 |
| 2010/0169137 A1* | 7/2010 | Jastrebski et al. | 705/7 |

OTHER PUBLICATIONS

"U.S. Appl. No. 09/793,843, Non Final Office Action mailed Jun. 13, 2006", 18 pgs.

"U.S. Appl. No. 09/793,843, Non Final Office Action mailed Dec. 9, 2005", 16 pgs.

"U.S. Appl. No. 09/793,843, Notice of Allowance mailed Apr. 13, 2007", 8 pgs.

"U.S. Appl. No. 09/793,843, Preliminary Amendment filed Aug. 19, 2004", 11 pgs.

"U.S. Appl. No. 09/793,843, Response filed Feb. 20, 2007 to Final Office Action mailed Feb. 9, 2007", 17 pgs.

"U.S. Appl. No. 09/793,843, Response filed Feb. 22, 2006 to Non Final Office Action mailed Dec. 9, 2005", 17 pgs.

"U.S. Appl. No. 09/793,843, Response filed Apr. 5, 2005 to Restriction Requirement mailed Mar. 17, 2005", 13 pgs.

"U.S. Appl. No. 09/793,843, Response filed Aug. 3, 2006 to Non Final Office Action mailed Jun. 13, 2006", 20 pgs.

"U.S. Appl. No. 09/793,843, Restriction Requirement mailed Mar. 17, 2005", 8 pgs.

"U.S. Appl. No. 12/005,005, Final Office Action mailed Sep. 28, 2010", 24 pgs.

"U.S. Appl. No. 12/005,005, Non Final Office Action mailed Apr. 12, 2011", 26 pgs.

"U.S. Appl. No. 12/005,005, Non-Final Office Action mailed Apr. 15, 2010", 19 pgs.

"U.S. Appl. No. 12/005,005, Response filed Jun. 27, 2011 to Non-Final Office Action Received Apr. 12, 2011", 10 pgs.

"U.S. Appl. No. 12/005,005, Response filed Jul. 15, 2010 to Non Final Office Action mailed Apr. 15, 2010", 9 pgs.

"U.S. Appl. No. 12/005,005, Response filed Dec. 22, 2010 to Final Office Action mailed Sep. 28, 2010", 10 pgs.

"U.S. Appl. No. 12/005,005, Final Office Action mailed Oct. 14, 2011", 14 pgs.

"U.S. Appl. No. 12/005,005, Response filed Jan. 16, 2012 to Final Office Action mailed Oct. 14, 2011", 10 pgs.

Chakrabarti, Deepayan, et al., "Fully Automatic Cross-associations", in Proceedings on the Tenth ACM SIGKDD International Conference on Knowledge Discovery and Data Mining, (2004), 1-12.

* cited by examiner

GRAPH PATTERN RECOGNITION INTERFACE

CROSS REFERENCE TO RELATED APPLICATIONS

This application is a continuation of U.S. application Ser. No. 11/963,452 filed Dec. 21, 2007, now U.S. Pat. No. 8,046, 324, entitled, "GRAPH PATTERN RECOGNITION INTERFACE," which claims priority under 35 U.S.C. §119(e) to U.S. Provisional Patent Application entitled "GRAPH PATTERN RECOGNITION INTERFACE," (Ser. No. 60/991, 539) filed on Nov. 30, 2007, which applications are incorporated by reference in their entirety herein.

TECHNICAL FIELD

The present application relates generally to the technical field of algorithms and programming and, in one specific example, the displaying of transaction data and patterns developed therefrom.

BACKGROUND

Social networks define certain characteristics regarding persons in terms of habit, values, and the like. In certain cases, patterns may be detected within social networks, where these patterns reflect habits, values, and the like. For example, if one member of a social network engages in certain behaviors, then it may be implied that other members of the social network also may engage in these behaviors.

BRIEF DESCRIPTION OF THE DRAWINGS

Some embodiments are illustrated by way of example and not limitation in the figures of the accompanying drawings in which.

DETAILED DESCRIPTION

Figure 1:
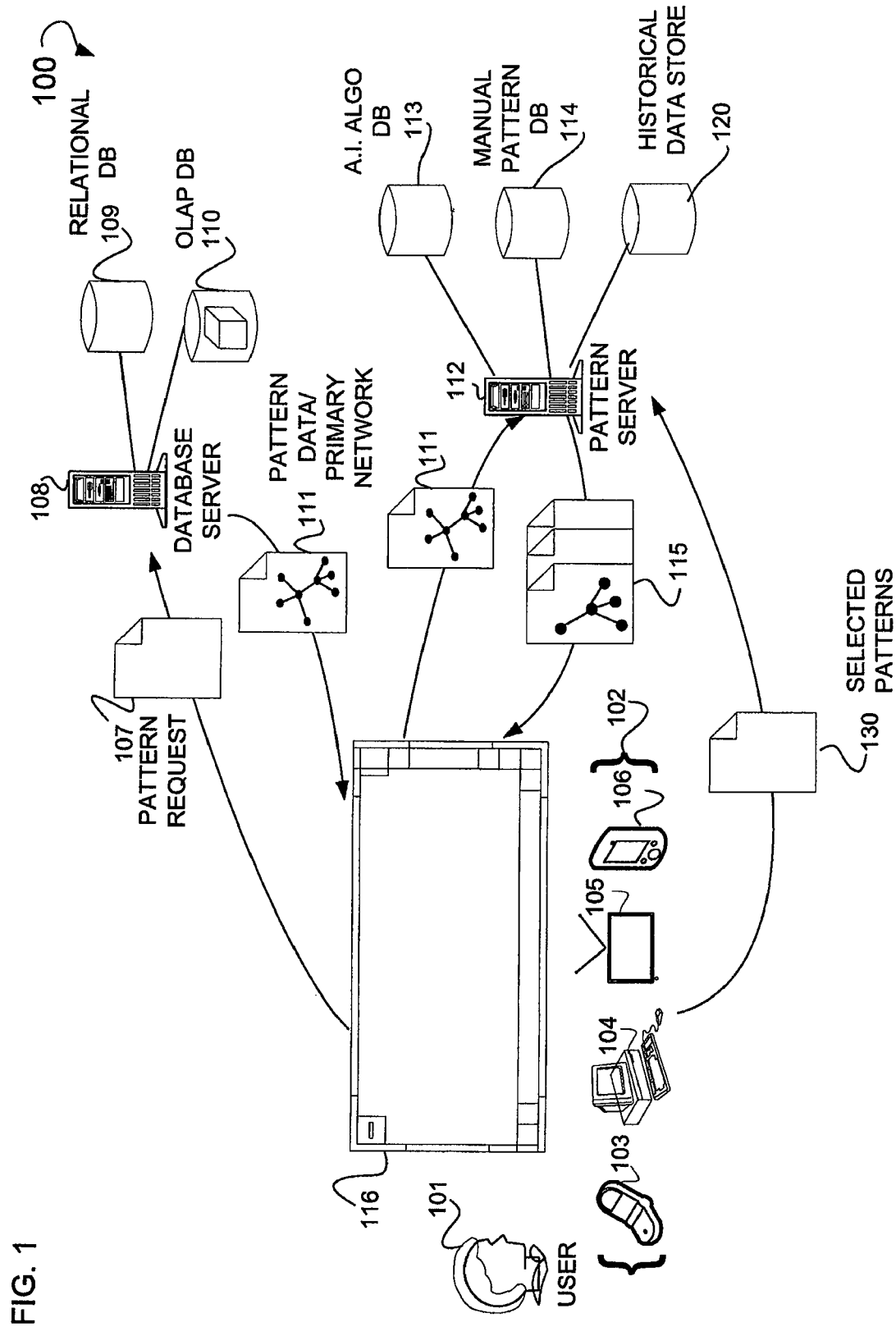
FIG. 1 is a diagram of a system, according to an example embodiment, illustrating the generation and display of pattern data.

A system and method follows for displaying a graph and patterns related to the graph. In the following description, for purposes of explanation, numerous specific details are set forth to provide a thorough understanding of some embodiments. It may be evident, however, to one skilled in the art that some embodiments may be practiced without these specific details.

In some example embodiments, a system and method is illustrated that allows for a specific graph to be identified via the graphs similarity to a recognized pattern. A recognized pattern may be generated through a manually recognized pattern, or algorithmically. In some example cases, a GUI is implemented that contains a primary network and at least one secondary network, where both the primary and secondary networks are graphs. In some example cases, this primary network may be a suspected fraud network, a purchaser's network, or some other network depicting relationships between persons. This primary network may also reflect representations of identity in a graphical format. These representations may include email addresses and other suitable information for representing a person. Additionally, in some example embodiments, the at least one secondary network may be displayed in a reference matrix, a reference list, or through some other suitable way of displaying a pattern in a GUI. A user such as a fraud prevention specialist, marketing professional, customer service representative, or other suitable person may then analyze the primary network and compare it to the at least one secondary network. Where a match is determined to exist between the primary network and the secondary network, the user can manually select this match. By manually selecting a match, the primary network may be classified as a type related to the secondary network. For example, if the secondary network is associated with a classification "B", then the primary network may also be associated with this classification "B". Once classified, the primary network may be stored for future use as a secondary network. This process of storing for future use may be classified as feedback. Classifications, in general, may be associated with types of fraud schemes, marketing networks, or some other suitable type of network.

In some example embodiments, secondary networks may be generated through analyzing a primary network. In one example embodiment, a primary network is analyzed for its properties, and these properties are then used to determine similar secondary networks. As will be more fully discussed below, this determination may be carried out through the use of A.I. algorithms, or through some type of mapping between nodes and edges of the primary network and nodes and edges of a secondary network. These A.I. algorithms may also include certain statistical techniques, or advanced statistical techniques. Further, these statistical techniques, or advanced statistical techniques, may be used in lieu of an A.I. algorithm in some example cases.

Some example embodiments may include the use of transaction data taken from various on-line transactions to generate both a primary and secondary network. For example, in a transaction between two persons (e.g., a natural or legal person such as a corporation), an account held by a person may form the nodes of the network, and the actual transactions extending between the accounts may form edges in the network. In some example embodiments, email addresses, cookies, general machine identification (e.g., a Media Access Control Address (MAC)), or other suitable identification may be used to distinguish persons. The network may be the previously referenced primary and/or secondary network.

Example System

FIG. 1 is a diagram of an example system 100 illustrating the generation and display of pattern data. Shown is a user 101 who, utilizing any one of a number of devices 102, may generate a pattern request 107. This any one of a number of devices 102 may include for example a cell phone 103, a computer 104, a television 105 and/or a Personal Digital Assistant (PDA) 106. Residing on any one of the number of devices 102 may be, for example, a Graphical User Interface (GUI) 116. Utilizing this GUI 116, the user 101 may generate the pattern request 107. The pattern request 107 may be a Hyper Text Transfer Protocol (HTTP) based query that utilizes other technologies including a Hyper Text Markup Language (HTML), an eXtensible Markup Language (XML), Dynamic-HTML (DHTML), Asynchronous JavaScript and XML (AJAX), JavaScript, Applets, or some other suitable technology. Further, a Structured Query Language (SQL), or a Multidimensional Expression Language (MDX) may also be used, in part, to generate the pattern request 107. This pattern request 107 may be transmitted, in some example embodiments, across a network (not pictured) to a database server 108. This network may be an Internet, Wide Area Network (WAN), a Local Area Network (LAN), or some other suitable network. This database server 108 may be operatively connected to, for example, a relational database 109 and/or an Online Analytic Processing (OLAP) database 110. Upon receiving the pattern request 107, the database server 108 may retrieve from either or both the relational database 109 and OLAP database 110 pattern data 111. This pattern data 111 may be then sent across a network (not pictured) to be displayed in the GUI 116.

In some example embodiments, the pattern data 111 is a formatted file containing data describing a graph. This data may include node types and names, numbers of edges, numbers of degrees per node, types and number of edges connecting nodes, and other suitable information. In some example embodiments, the formatted file is formatted using XML, some type of character delimitation (e.g., a semi-colon delimited flat file, or comma delimited flat file), or some other suitable method of formatting. Some example embodiments may include the pattern data 111 being a Joint Photographic Experts Group (JPEG) formatted image.

Once displayed, the user 101 may select a portion of the pattern data 111 for further details. In some example embodiments, the pattern data 111 is transmitted by the database server 108 not only to be displayed in the GUI 116, but also the database server 108 may transmit this pattern data 111 to a pattern server 112. Upon receiving the pattern data 111, the pattern server 112 may determine patterns that are similar to the pattern data provided in the pattern data 111. This determination may be based upon various Artificial Intelligence (A.I.) algorithms stored in an A.I. algorithm database 113. Further, pattern server 112 may utilize a manual pattern database 114 containing various types of patterns manually stored or, in some cases, automatically stored by, for example, a user 101. These various patterns closely correspond to, for example, the pattern contained within the pattern data 111. Further, in some cases, historical data stored in a historical data store 120 may be accessed by the pattern server 112 so as to be utilized to, for example, train an A.I. algorithm contained within the A.I. algorithm database 113.

In one example embodiment, the pattern data 111 is received by the pattern server 112, processed, and a plurality of secondary network data 115 (e.g., patterns) retrieved. This secondary network data 115 may be displayed in the GUI 116 along with the pattern data 111. The pattern data 111 may be displayed as a primary network 220. In some cases, the user 101 may, for example, select one or more of the secondary network data 115. This selection may include the utilization of some type of suitable input device such as a mouse, keyboard, light pen, touch screen, or other suitable device so as to allow the user 101 to select one of these secondary networks. Once selected, the pattern data 111 may be categorized as a part of a particular taxonomy and then transmitted as a selected pattern or patterns 130 from the one or more devices 102 to the pattern server 112. This transmission of the selected pattern or patterns 130 may take place over, for example, a network (not shown) such as an Internet, LAN, or WAN. Once the pattern server 112 receives the selected pattern or patterns 130, it may then store the selected patterns into, for example, the manual pattern database 114 and/or the historical data store 120.

Example Interface

Figure 2:
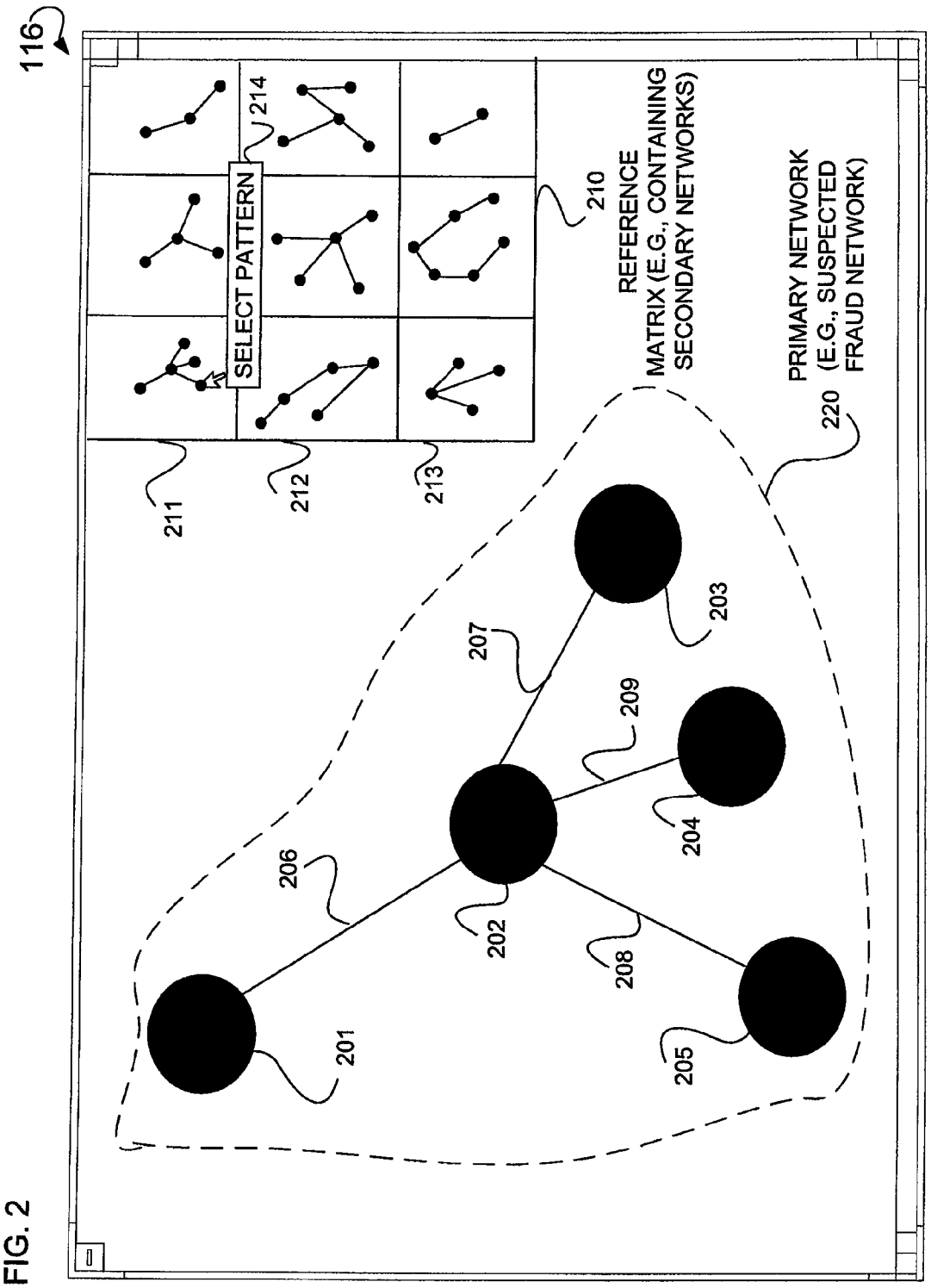
FIG. 2 is a diagram of a Graphical User Interface (GUI), according to an example embodiment, displaying the pattern data (e.g., a primary network) and various secondary networks here displayed in a reference matrix.

FIG. 2 is a diagram of an example GUI 116 displaying the pattern data 111 (here referenced as a primary network) and various secondary networks here displayed in a reference matrix 210. Shown is a primary network 220, such as for example, a suspected fraud network. Contained within this primary network 220 is a graph composed of a plurality of nodes and edges. For example, a node 201 is connected to a node 202 via an edge 206. This node 202, in turn, is connected to a node 205 via an edge 208. Further, the node 202 is connected to a node 204 via an edge 209. Additionally, the node 202 is connected to a node 203 via an edge 207. In some example embodiments, each one of these nodes represents an account whereas each one of these edges (e.g., 206 through 209) represents a relationship in the form of a transaction between accounts. This transaction between accounts (e.g., transaction data) may be a sales transaction, refund transaction, a payment transaction, or other suitable transaction. In some example embodiments, the edges are directed (e.g., in cases where funds are flowing from one account to another), while in other cases the edges are bi-directional. In some example embodiments, the user 101, utilizing some type of I/O device, may select one or more patterns (e.g., graphs) displayed within the reference matrix 210. For example, shown is a row 211 containing one or more patterns. Further, a row 212 also shows various patterns, and a row 213 further shows various patterns. Further, as illustrated herein, a mouse pointer 214 is used to select the first secondary network displayed in the row 211 as being similar to the primary network 220.

Figure 3:
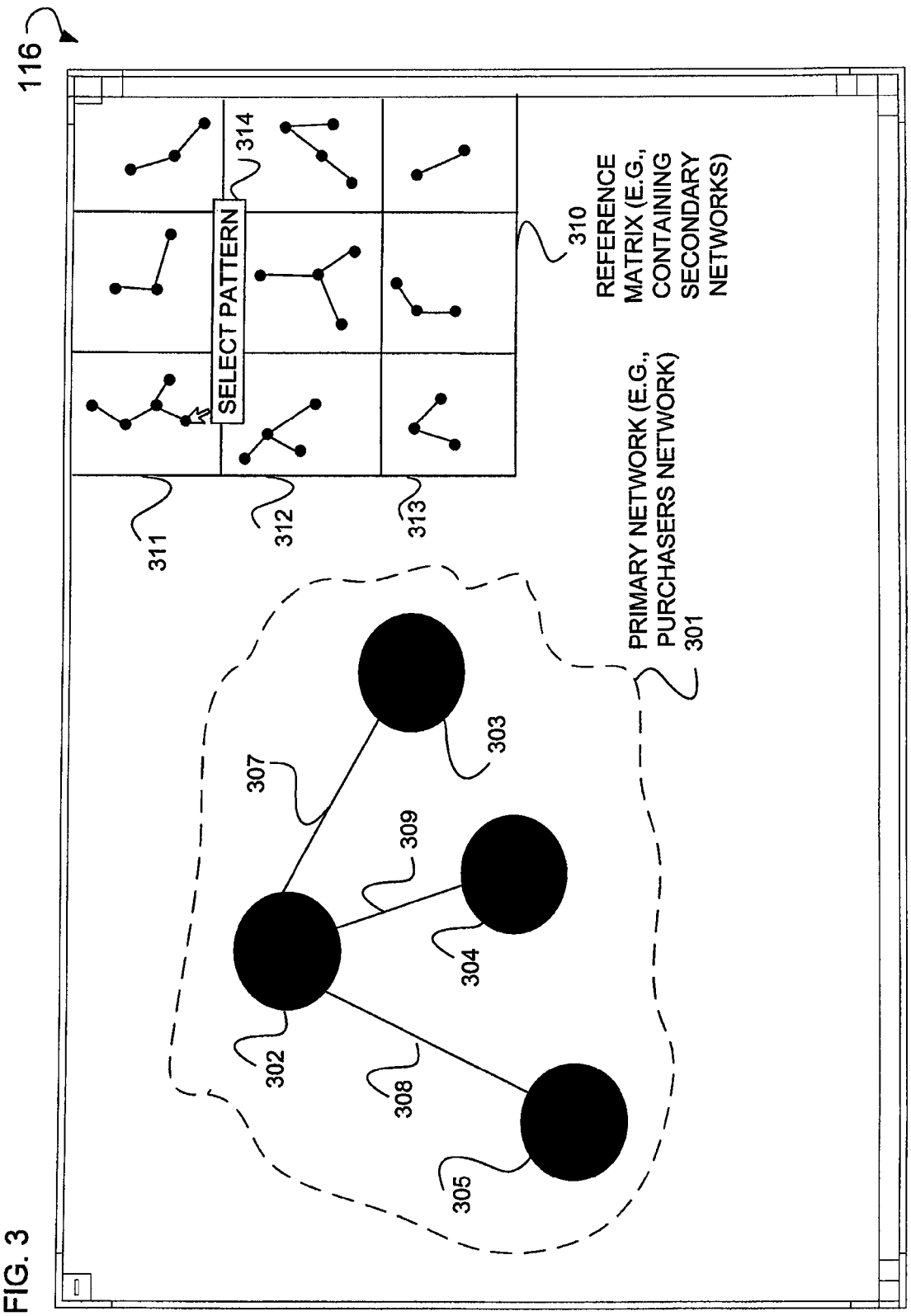
FIG. 3 is a GUI, according to an example embodiment, displaying a primary network and, additionally, various secondary networks wherein this primary network relates, more generally, to purchaser networks.

FIG. 3 is an example GUI 116 displaying a primary network and, additionally, various secondary networks wherein this primary network relates, more generally, to purchaser networks. Shown is a GUI 116 containing a number of graphs. These graphs represent, for example, various networks. For example, primary network 301 contains a network composed of nodes and edges. Node 302 is shown as are nodes 303, 304 and 305. The node 302 is connected to the node 305 via an edge 308. The node 302 is connected to the node 304 via an edge 309, and the node 302 is further connected to a node 303 via an edge 307. Further shown is a reference matrix 310 containing a plurality of secondary networks. These secondary networks may be provided through various secondary network data 115 generated and transmitted by the pattern server 112 and then displayed on or as part of the GUI 116. In some example embodiments, the user 101, utilizing a mouse pointer 314, may select, for example, a graph or network appearing within the row 311. Additional rows shown in this reference matrix 310 is a row 312 and a row 313, each of which contains a plurality of networks. In some example embodiments, purchaser network, such as primary network 301, may refer to various purchasers of particular goods or services as denoted by nodes 302, 303, 304 and 305 and relationships between these various purchasers in the form of edges 307, 308 and 309. As discussed elsewhere, these edges may be directed or non-directed, bi-lateral edges.

Figure 4:
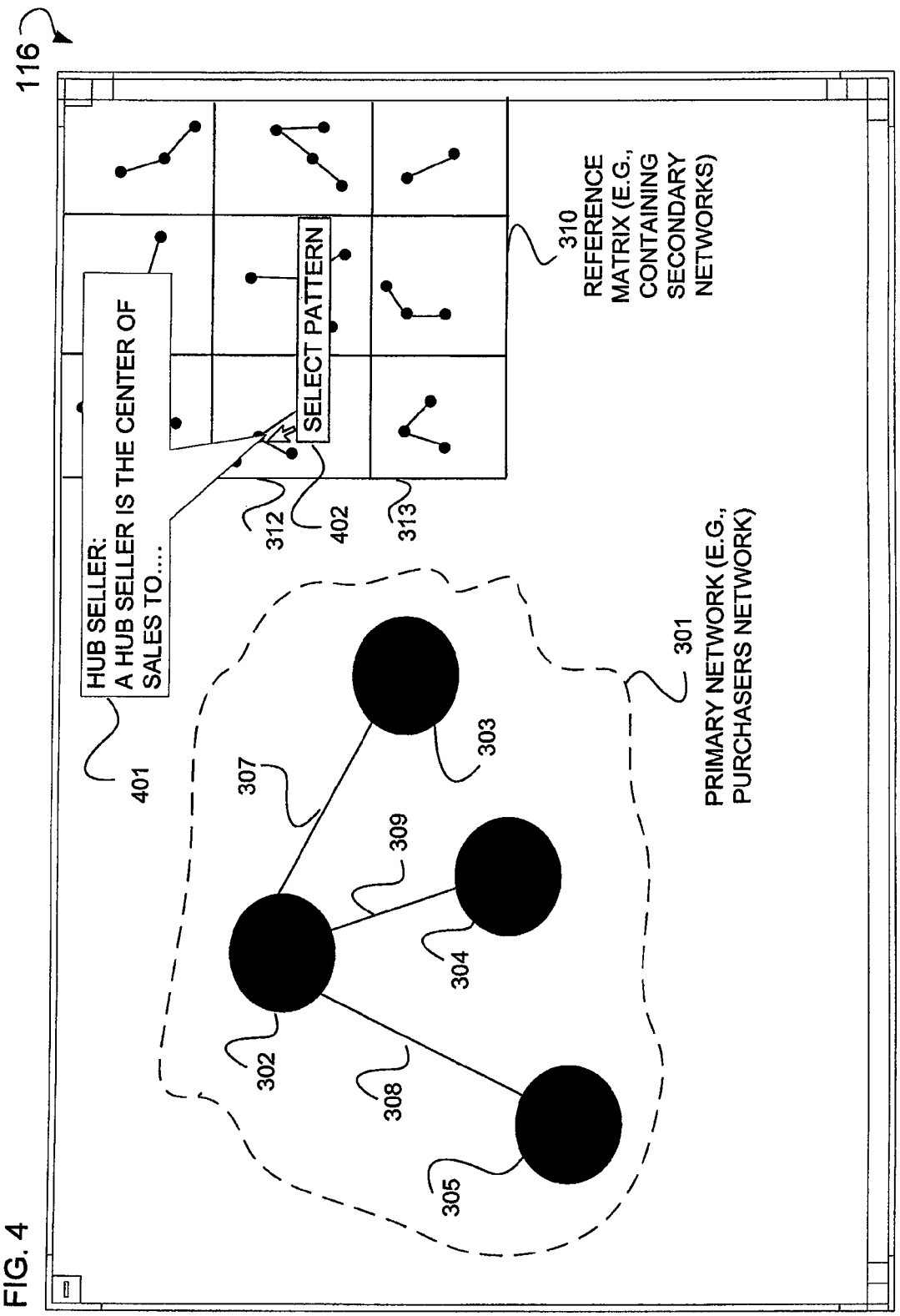
FIG. 4 is a diagram of a GUI, according to an example embodiment, containing popup information relating to a particular selected secondary network.

FIG. 4 is a diagram of an example of GUI 116 containing popup information relating to a particular selected secondary network. Shown is a popup 401 containing the description of a secondary network. This popup 401, in some example embodiments, may be generated through the mouseover function or other suitable function engaged in by the user 101 wherein this user 101 may, for example, perform mouseover of, for example, a graph appearing in, for example, row 312. This mouseover may be facilitated through the use of, for example, mouse pointer 402 to select the pattern and thereby generate the mouseover function in operation. Once the mouseover function operation is executed, then the popup 401 will be displayed. This popup 401 may contain detailed information relating to the particular graph to which the mouse pointer 402 is applied for purposes of a mouseover operation or function.

In some example embodiments, the GUI 116 is implemented using anyone of a number of technologies. These technologies may include a browser application, or a stand alone application. This browser application may be capable of interpreting HTML, XML, or some other suitable markup language. As to a stand alone application, in some example embodiments, a programming language such as C#, Java, C++, or others may be used to generate a stand-alone application.

Example Logic

Figure 5:
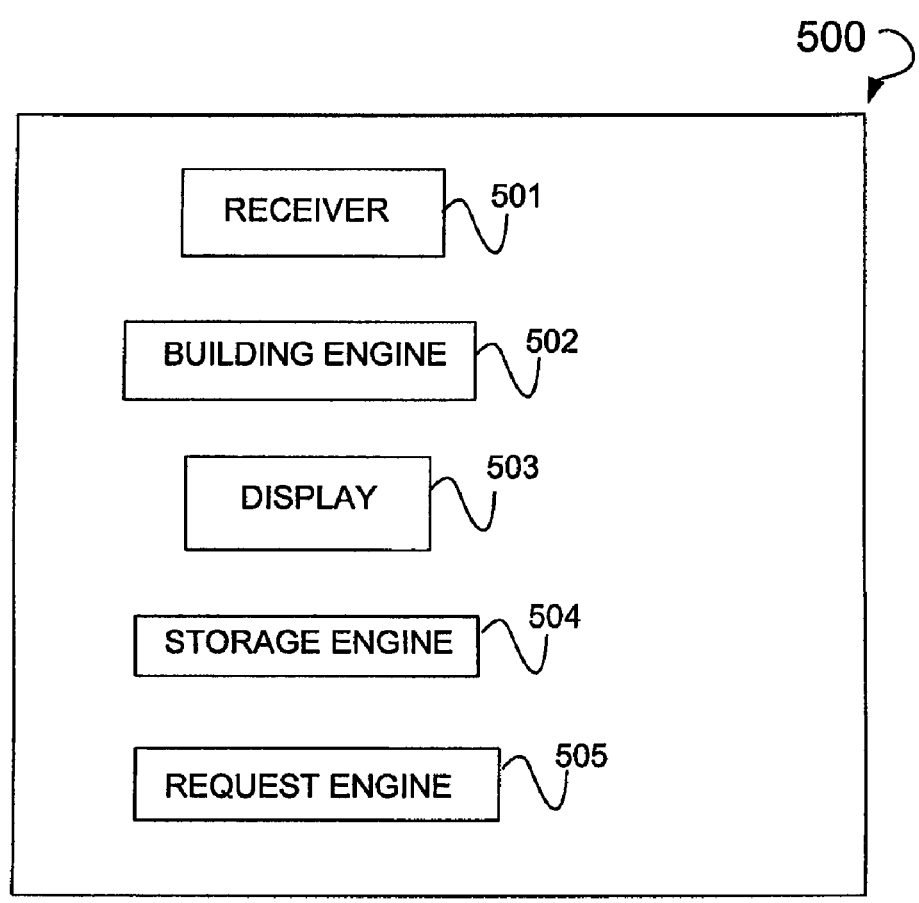
FIG. 5 is a block diagram of a computer system, according to an example embodiment, used to generate a reference matrix as it may appear within a GUI.

FIG. 5 is a block diagram of a computer system 500. This computer system 500 may be, for example, a pattern server 112, or one of the devices 102. The various blocks illustrated herein may be implemented in software, firmware, or hardware. Shown is a receiver 501 to receive pattern data that includes transaction data relating to transactions between persons. A building engine 502 is also shown to build at least one secondary network based upon the pattern data. A display 503 is shown to display the at least one secondary network. In some example embodiments, the building engine 502 may build at least one secondary network with an A.I. algorithm that processes at least one of a pattern characteristic set, or historical data. The display may include a plurality of secondary networks (see e.g., GUI 116). Some example embodiments may include, the building engine 502 including at least one secondary network built by mapping manual patterns to the pattern data. A storage engine 504 may be implemented to store the at least one secondary network into a data store as a manual pattern. The manual pattern includes a pattern selected by a user. A request engine 505 may be implemented to process a request for a quick reference matrix based upon the pattern data. In some example embodiments, the secondary network includes at least one of node, or edge data generated through an analysis of pattern data. Further, the transaction data may include at least one of a sales transaction data, or a payment transaction data.

Figure 6:
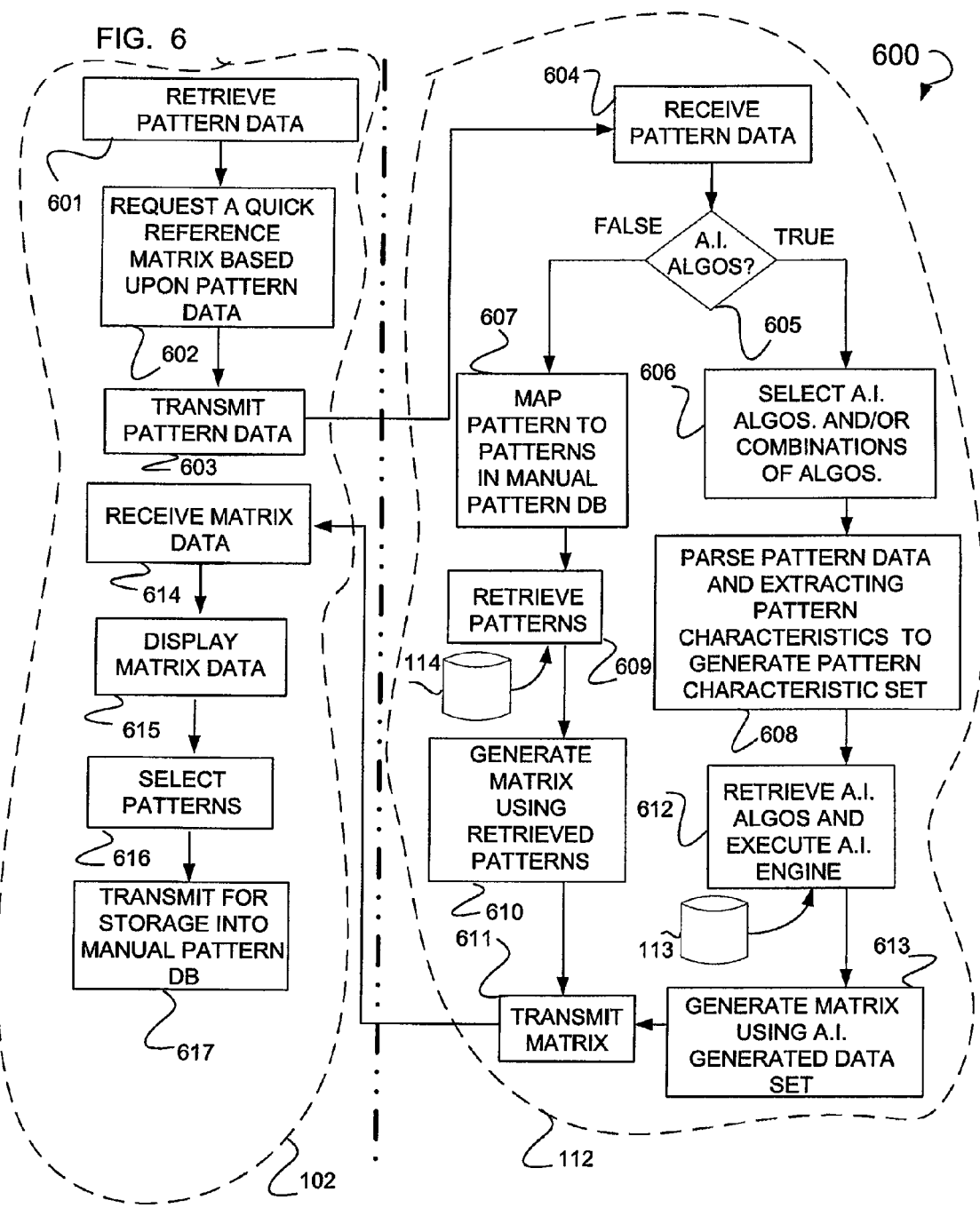
FIG. 6 is a dual stream flowchart illustrating a method, according to an example embodiment, used to generate a reference matrix as it may appear within a GUI.

FIG. 6 is a dual stream flowchart illustrating an example method 600 used to generate a reference matrix as it may appear within, for example, a GUI 116. Illustrated is a first stream containing a plurality of operations 601 through 603, and operations 614 through 617. Also shown is a second stream containing operations 604 through 613. With regard to the first stream, in some example embodiments, an operation 601 is executive that retrieves pattern data. This pattern data may be, for example, the pattern data 111. Upon execution of the operation 601, a further operation 602 may be executed that requests a quick reference matrix based upon the pattern data. This quick reference matrix may be, for example, the reference matrix 310. An operation 603 may then be executed that transmits the pattern data 111 across a network to be received through the execution of an operation 604.

In some example embodiments, a decisional operation 605 may be executed that determines whether or not various A.I. algorithms may be utilized in the generation of the various secondary networks contained within the reference matrix such as reference matrix 310. In cases where decisional operation 605 evaluates to "true," an operation 606 may be executed that selects an A.I. algorithm or combinations of A.I. algorithms. An operation 608 may be executed that parses the pattern data, which is pattern data 111, and extracts certain characteristics relating to the pattern data so as to generate a pattern characteristic set. An operation 612 may be executed that retrieves the A.I. algorithms and executes an A.I. engine wherein these A.I. algorithms are retrieved from, for example, an A.I. algorithm database 113. An operation 613 may be executed that generates a matrix such as the reference matrix 310 using the A.I. generated dataset. An operation 611 may then be executed that transmits the matrix as secondary network data 115. In cases where decisional operation 605 evaluates to "false," an operation 607 may be executed. This operation 607 may map the pattern data to patterns contained within the manual pattern database 114. An operation 609 may be executed that retrieves patterns from the manual pattern database 114 for the purposes of executing operation 607. An operation 610 may be executed that generates a matrix using the retrieved patterns. This matrix may be, for example, referenced the reference matrix 310. An operation 611 may then be executed to transmit the matrix. Once the secondary network data 115 is transmitted, an operation 614 may be executed that receives the secondary network data. An operation 615 may be executed that displays the matrix data as, for example, a reference matrix 310. An operation 616 may be executed that selects certain patterns. This operation 616 may, in some example embodiments, receive input from, for example, the user 101 such the user 101 uses some type of I/O device and selects one of the patterns displayed within, for example, the reference matrix 310 so as to generate a selected patterns or pattern 130. An operation 617 may then be executed to transmit for storage the selected patterns or patterns 130 into the manual pattern database 114. In some example embodiments, the operations 601 through 603 and 614 through 617 may reside as a part of the one or more devices 102. Some example embodiments may also include the operations 614 through 613 residing as a part of, for example, the pattern server 112.

Figure 7:
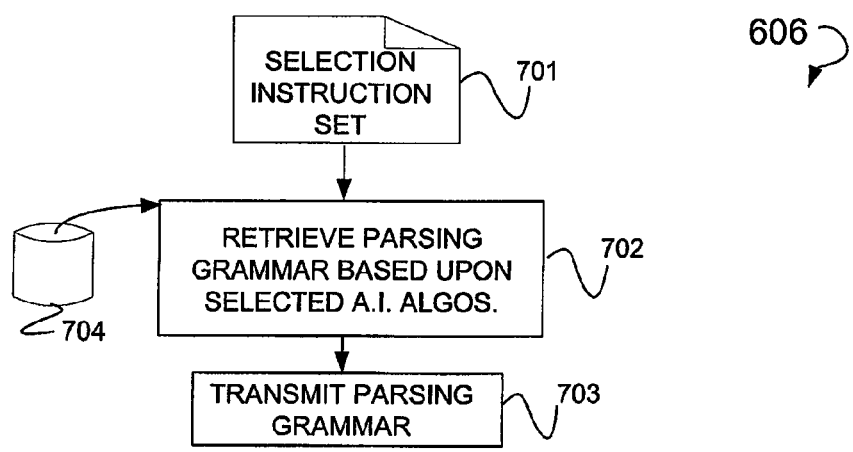
FIG. 7 is a flowchart illustrating a method, according to an example embodiment, used to execute an operation that selects an Artificial Intelligence (A.I.) algorithm, or combinations of A.I. algorithms.

FIG. 7 is a flowchart illustrating example method used to execute operation 706. Shown is a selection instruction set 701. An operation 702 may be executed that retrieves a parsing grammar based on a selected A.I. algorithm from, for example, a data store 704. The retrieval of the particular parsing grammar may be based upon the instructions contained within the selection instruction set 701. An operation 703 may be executed that transmits the parsing grammar.

Figure 8:
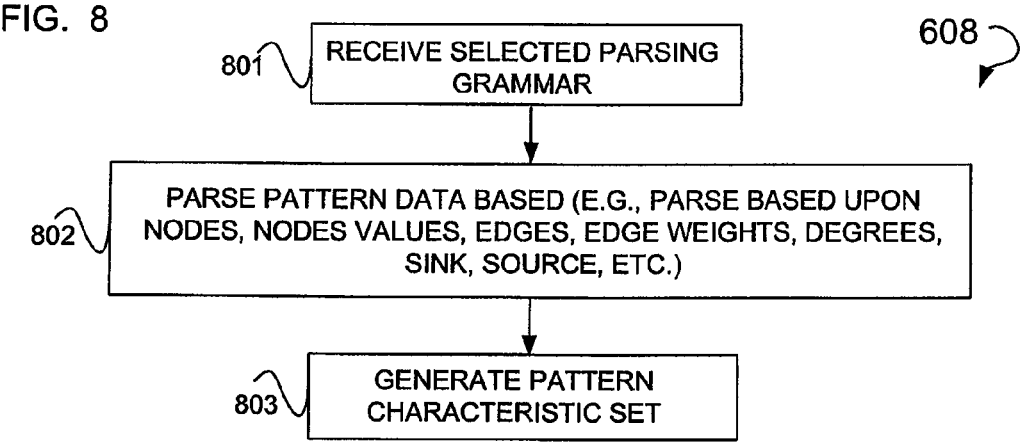
FIG. 8 is a flowchart illustrating a method, according to an example embodiment, used to execute an operation that parses pattern data and extracts certain characteristics relating to the pattern data so as to generate a pattern characteristic set.

FIG. 8 is a flowchart illustrating example method used to execute operation 608. Shown is an operation 801 that receives a selected parsing grammar. An operation 802 may then be executed that parses pattern data 111, extracting certain characteristics of pattern 111 data such as, for example, nodes, node values, edges, edge weights, degrees, sink identifiers, source identifiers, and other characteristics of the graph contained within the pattern data 111. An operation 803 may then be executed to generate a pattern characteristic set containing one or more of the above identified characteristics.

Figure 9:
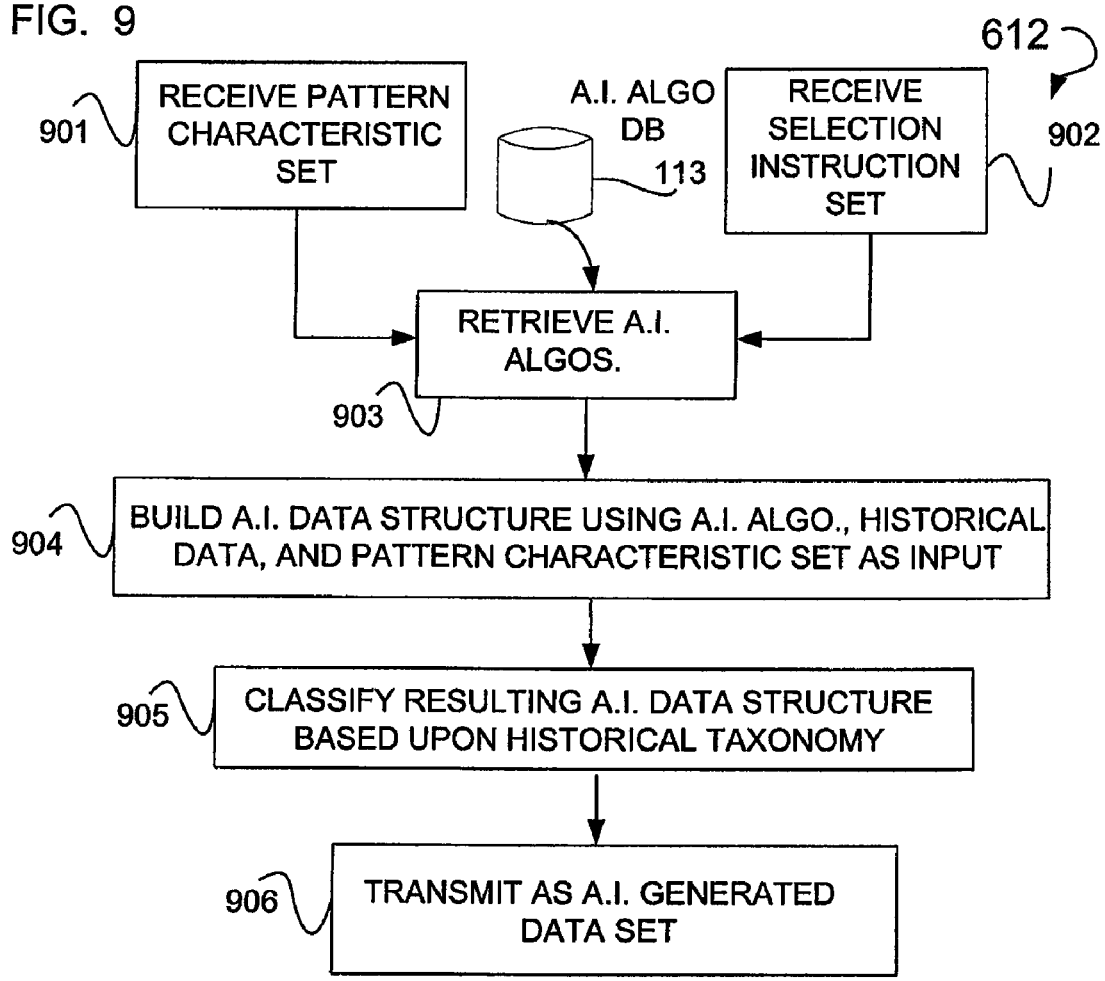
FIG. 9 is a flowchart illustrating a method, according to an example embodiment, used to execute an operation that retrieves the A.I. algorithms and executes an A.I. engine.

FIG. 9 is a flowchart illustrating an example method used to execute operation 612. Shown is an operation 901 that when executed receives a pattern characteristic set. Also shown is an operation 902 that when executed receives a selection instruction set. An operation 903, when executed, retrieves an A.I. algorithm from the A.I. algorithm database 113. An operation 904 may be executed that builds an A.I. data structure using the A.I. algorithm retrieved from the A.I. algorithm database 113. An operation 905 may be executed that classifies the resulting A.I. data structure based upon some historical taxonomy. An operation 906 may be executed that transmits this A.I. generated dataset.

In some example embodiments, as will be more fully discussed below, historical data is retrieved and used to train the A.I. algorithm(s) retrieved through the execution of the operation 903. Once sufficiently trained, an A.I. data structure may be implemented to generate secondary networks. The various A.I. algorithms that may be implemented are more fully discussed below.

Some example embodiments may include any number of deterministic algorithms implemented in the A.I. algorithm database 113, including case-based reasoning, Bayesian networks (including hidden Markov models), neural networks, or fuzzy systems. The Bayesian networks may include: machine learning algorithms including-supervised learning, unsupervised learning, semi-supervised learning, reinforcement learning, transduction, learning to learn algorithms, or some other suitable Bayesian network. The neural networks may include: Kohonen self-organizing network, recurrent networks, simple recurrent networks, Hopfield networks, stochastic neural networks, Boltzmann machines, modular neural networks, committee of machines, Associative Neural Network (ASNN), holographic associative memory, instantaneously trained networks, spiking neural networks, dynamic neural networks, cascading neural networks, neuro-fuzzy networks, or some other suitable neural network. Further, the neural networks may include: machine learning algorithms including-supervised learning, unsupervised learning, semi-supervised learning, reinforcement learning, transduction, learning to learn algorithms, or some other suitable learning algorithm.

In some embodiments, any number of stochastic algorithms may be implemented including: genetic algorithms, ant algorithms, tabu search algorithms, or Monte Carlo algorithms (e.g., simulated annealing). Common to these algorithms is the use of randomness (e.g., randomly generated numbers) to avoid the problem of being unduly wedded to a local minima or maxima.

Figure 10:
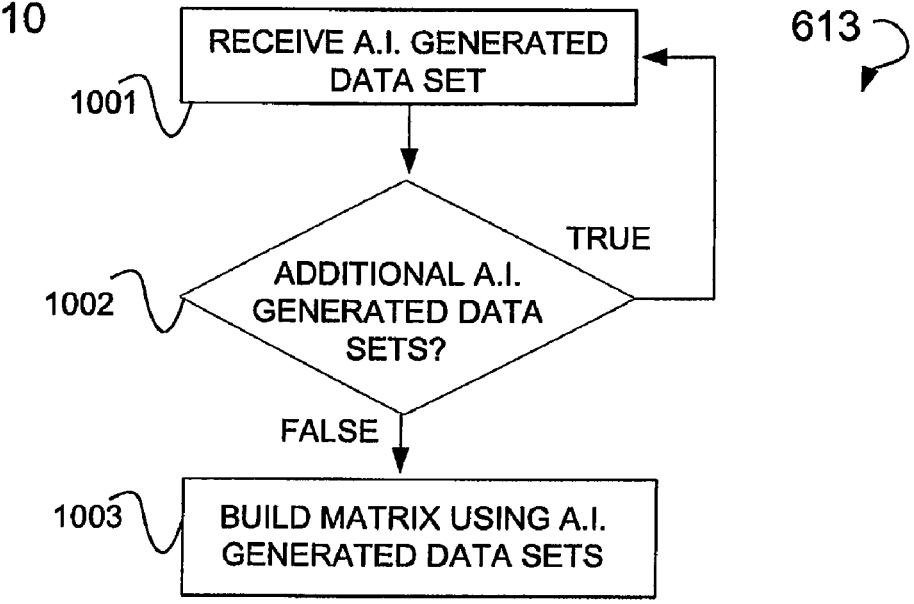
FIG. 10 is a flowchart illustrating a method, according to an example embodiment, used to execute an operation that generates a matrix such as the reference matrix using the A.I. generated dataset.

FIG. 10 is a flowchart illustrating example method used to execute operation 613. Shown is an operation 1001 that when executed receives an A.I. generated dataset. A decisional operation 1002 may be executed that determines whether additional A.I. generated datasets are necessary. In cases where decisional operation 1002 evaluates to true, operation 1001 is re-executed. In cases where decisional operation 1002 evaluates to false, a further operation 1003 is executed that builds a matrix using an A.I. generated dataset.

Figure 11:
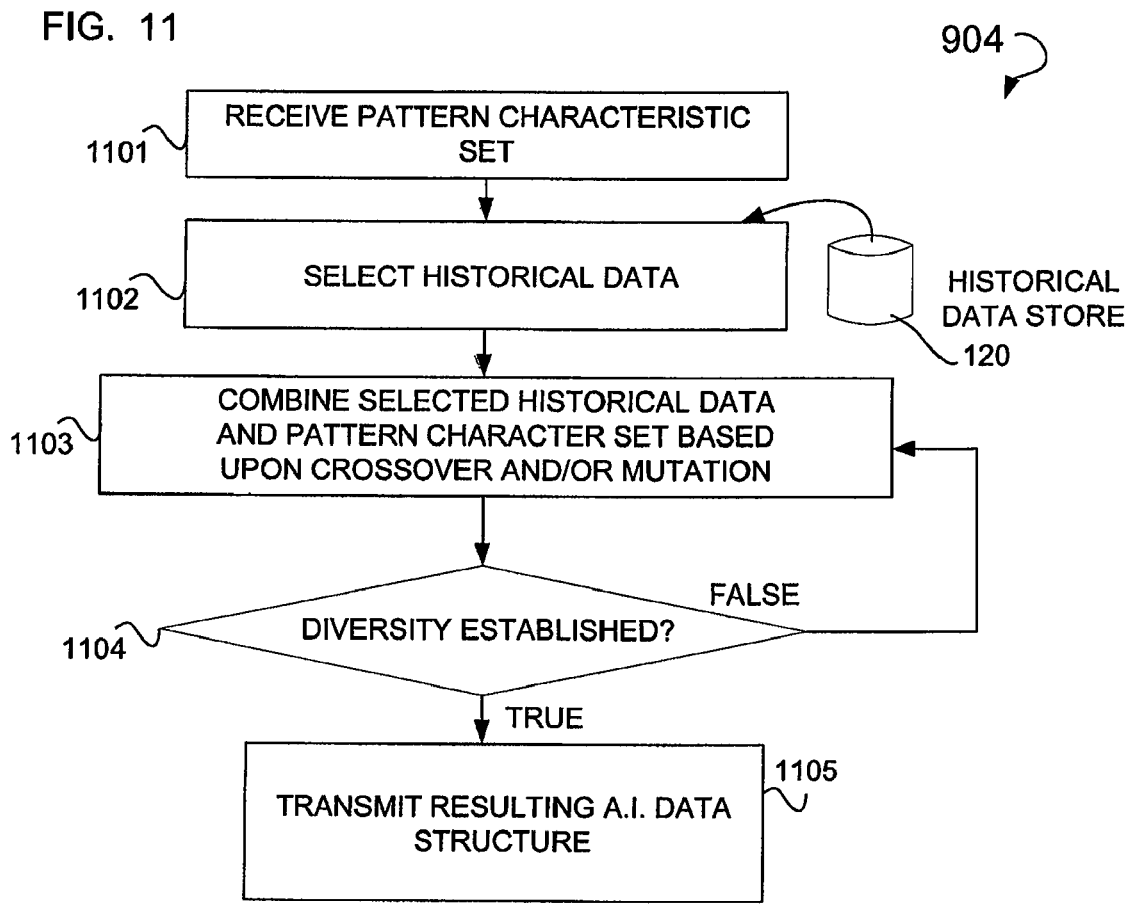
FIG. 11 is a flowchart illustrating a method, according to an example embodiment, used to execute an operation that builds an A.I. data structure (e.g., a genetically derived tree) using the A.I. algorithm retrieved from the A.I. algorithm database.

FIG. 11 is a flowchart illustrating an example method used to execute operation 904. Shown is an operation 1101 that receives a pattern characteristic set. An operation 1102 is executed that selects historical data through retrieving this historical data from, for example, historical data store 120. An operation 1103 may be executed that combines the selected historical data and pattern characteristic set data based upon some type of crossover and/or mutation function. A decisional operation 1104 may be executed that determines whether or not the diversity is established based on the execution of the crossover and/or mutation function. In cases where decisional operation 1104 evaluates to "true," diversity is established amongst the data contained in the pattern characteristic set. An operation 1105 is then executed that transmits the resulting A.I. data structure. In cases where decisional operation 1104 evaluates to "false," the operation 1103 is re-executed.

In some example embodiments, diversity may be based upon some predetermined number of iterations, recursive movements, and sampling. For example, the cross-over and/or mutation functions may be executed and the resulting data structure sampled to determine how it differs from some model case of diversity. This model case may be the historical data. A termination case may be set based upon the historical data such that where the termination case is met diversity is deemed to have been established.

Figure 12:
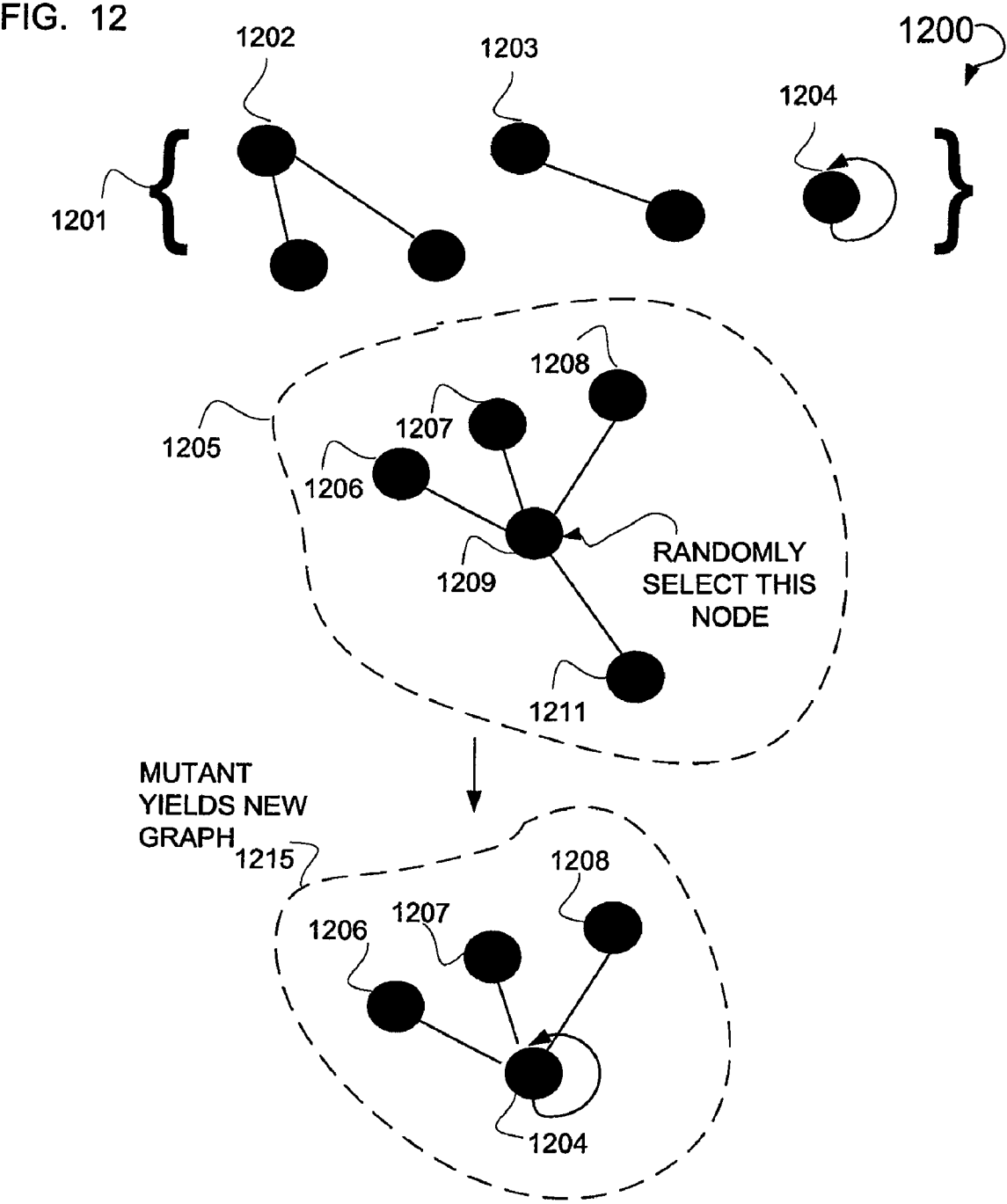
FIG. 12 is a diagram of graphs, according to an example embodiment, that may be generated as a result of the execution of a mutation function that combines the selected historical data and pattern characteristic set data.

FIG. 12 is a diagram of example graphs 1200 that may be generated as a result of the execution of mutation function as described in operation 1103. Shown is a set 1201 containing member graphs 1202, 1203 and 1204. Each of these graphs has a number of characteristics such that, for example, the graph 1202 has three nodes and two edges, the graph 1203 has two nodes and one edge, and the graph 1204 has one node and one self-referencing edge (e.g., a cycle). In some example embodiments, a graph 1205 is shown containing a number of nodes such as nodes 1206, 1207, 1208, 1209 and 1211. These various nodes are connected via plurality of edges. In one example embodiment, through the execution of a mutation function, one of these nodes, here for example node 1209, is randomly selected. Once selected, this node 1209 and, in some cases, associated child nodes are replaced with a graph taken from the set 1201. Here for example, the graph 1204 is used to replace any node 1209 and its child node 1211, generating a new graph 1215.

Figure 13:
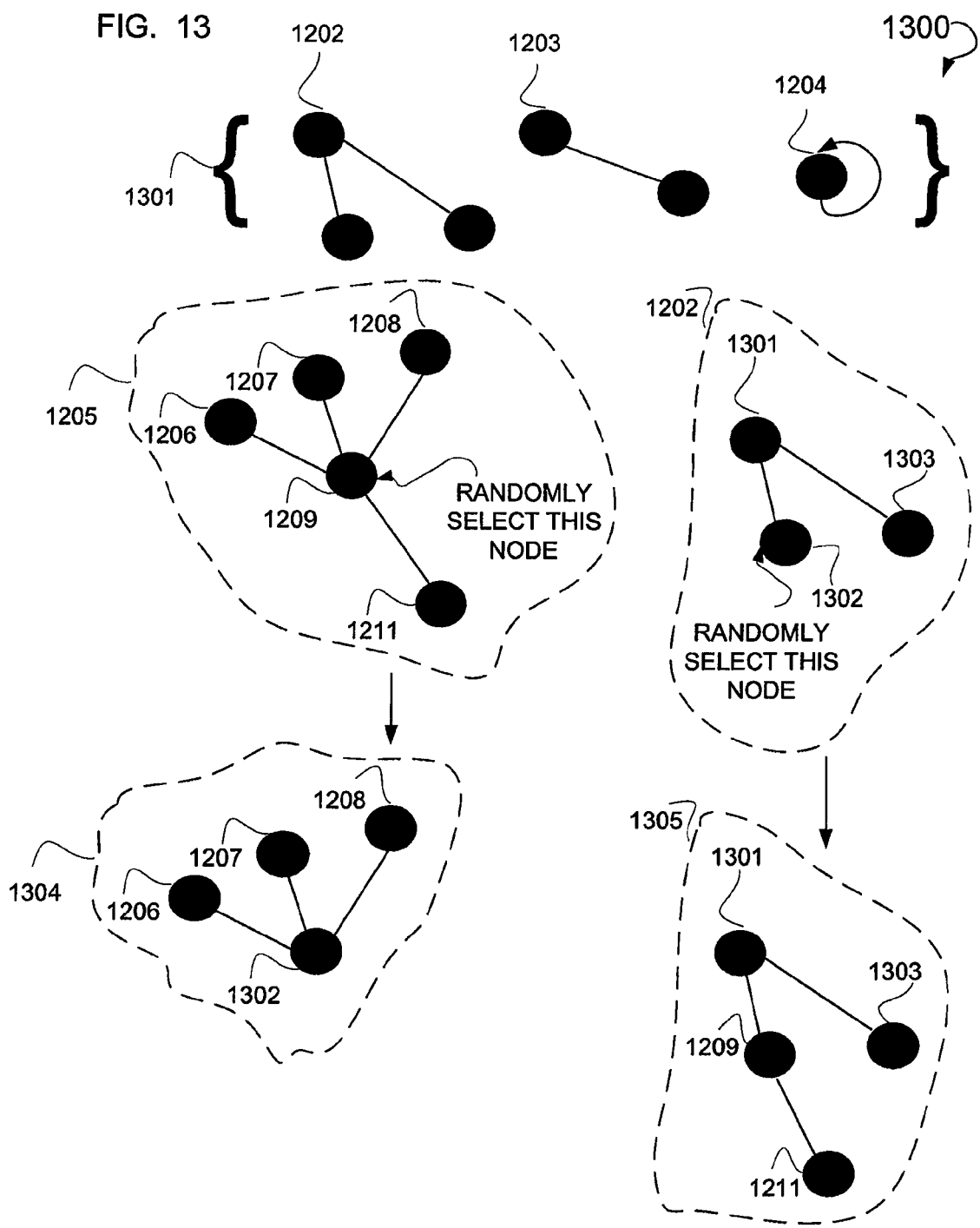
FIG. 13 is a diagram of a plurality of graphs, according to an example embodiment, that are generated through the execution of a crossover function.

FIG. 13 is a diagram of a plurality of graphs that are generated through the execution of a crossover function as described in operation 1103. Shown is a set 1301 containing a graph 1202, 1203 and 1204. Further, in some example embodiments, the graph 1205 is used as is the graph 1202 for the purposes of executing the crossover function. A node, such as node 1209, is randomly selected from the graph 1205. Further, a node, such as node 1302, is randomly selected from the graph 1202. Further, this graph 1202 also contains a node 1301 and node 1303. Through the execution of a crossover function, the randomly selected node of one graph is, and its children, are replaced with the node of a second randomly selected graph and its children. Here node 1209 and node 1211 are randomly selected and replaced with a node 1302. Similarly, node 1302 is randomly selected and replaced with the nodes 1209 and 1211. The result of this crossover is that a new graph 1304 is generated and a new graph 1305 is generated. In certain example cases, set 1301 is composed of members of data contained in the historical data store 120.

In some example embodiments, the operation 904 described in FIG. 9 and the associated graphs described in FIGS. 12 and 13 are reflective of the implementation of a genetic algorithm. While a genetic algorithm is a non-deterministic algorithm, certain other types of artificial intelligence algorithms may be utilized that are deterministic in nature.

Figure 14:
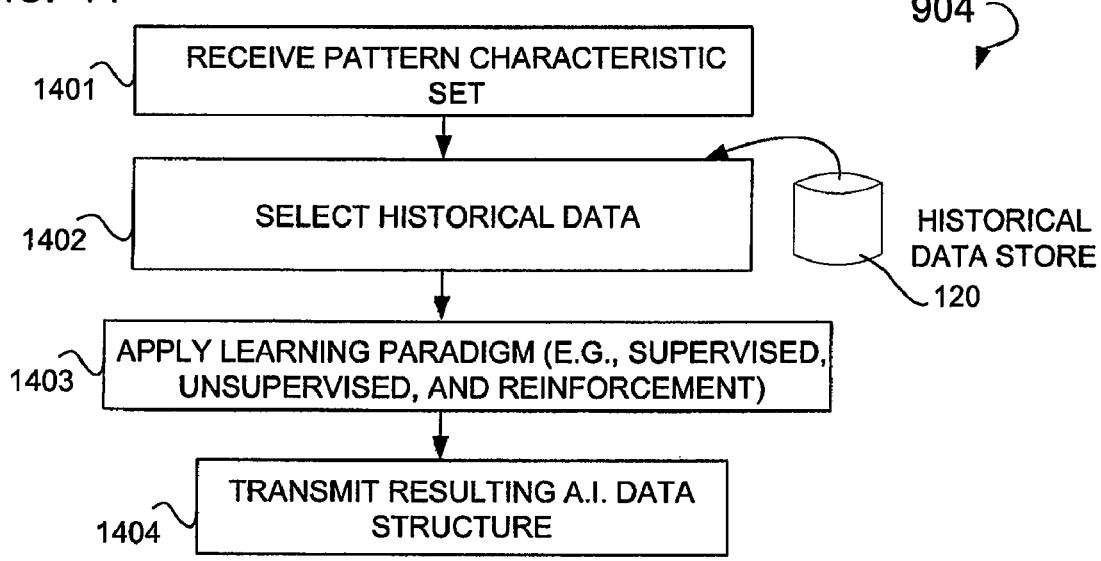
FIG. 14 is a flowchart illustrating a method, according to an example embodiment, used to execute an operation that builds an A.I. data structure (e.g., a neural network) using an A.I. algorithm retrieved from the A.I. algorithm database.

FIG. 14 is a flowchart illustrating an example method used to execute operation 904. Shown is an operation 1401 that receives a pattern characteristic set. An operation 1402 may be executed that selects historical data from a historical data store 120. An operation 1403 may be executed that applies some type of learning paradigm to the historical data wherein this learning paradigm may be, for example, supervised learning, unsupervised learning, reinforcement learning or some other suitable type of learning algorithm. An operation 1404 may be executed that transmits the A.I. data structure resulting from the application of certain A.I. algorithms for display within the GUI 116.

Figure 15:
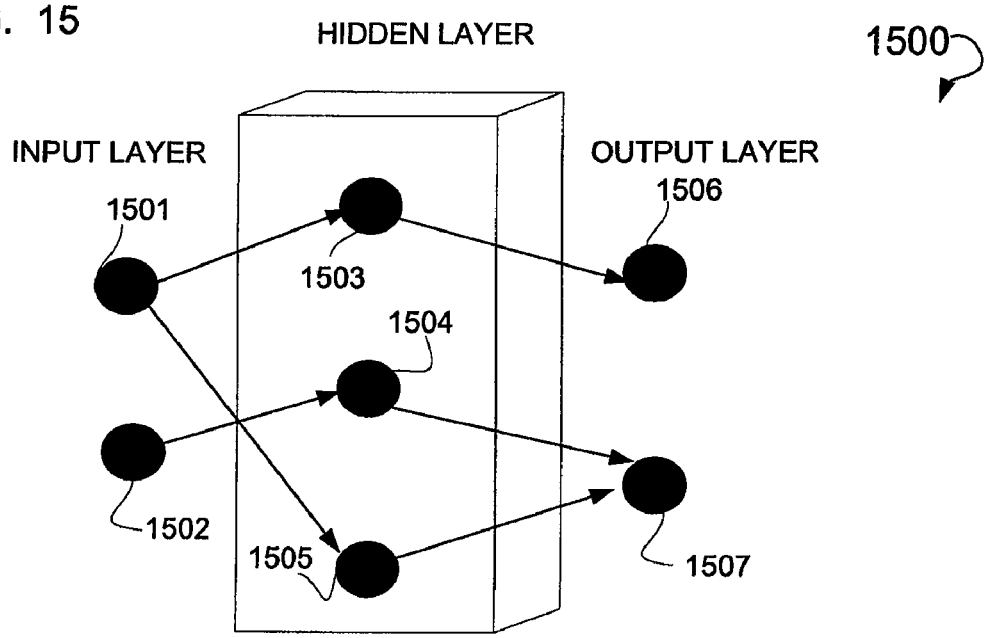
FIG. 15 is a diagram of a neural network, according to an example embodiment, generated through the application of a learning algorithm.

FIG. 15 is a diagram of an example neural network 1500 generated through the application of a learning algorithm. Shown is an input layer containing nodes 1501 and 1502, a hidden layer containing nodes 1503, 1504 and 1505, and an output layer containing nodes 1506 and 1507. In some example embodiments, the input layer receives input in the form of pattern data 111 which is then processed through the hidden layer and associated nodes 1503 through 1505. This hidden layer may contain certain types of functions used to facilitate some type of learning algorithm such as the aforementioned supervised, unsupervised or reinforcement learning algorithms. The output layer nodes 1506 and 1507 may then be used to output, for example, various A.I. data structures that are reflected in the secondary network data 115.

Some example embodiments may include training nodes 1503 through 1505 with historical data retrieved from the historical data store 120. This training may include instructing the nodes 1503 through 1505 as to what data to look for, and what type of data to exclude during the course of processing the pattern data. For example, pattern data describing a node (e.g., nodes in a graph) with more than six degrees may be excluded based of the training of the nodes 1503 through 1505 using historical data showing that nodes of more than three degrees are never encountered.

In some example embodiments, a neural network utilizing one or more of these learning algorithms may be implemented. In other example embodiments, a neural network may be implemented utilizing certain types of non-deterministic algorithms such as a Monte Carlo algorithm or some other suitable algorithm. Description of deterministic and non-deterministic algorithms is provided below. As previously referenced, these various deterministic and non-deterministic algorithms may be utilized independently or in conjunction with one another for purposes of generating the secondary network data 115.

Figure 16:
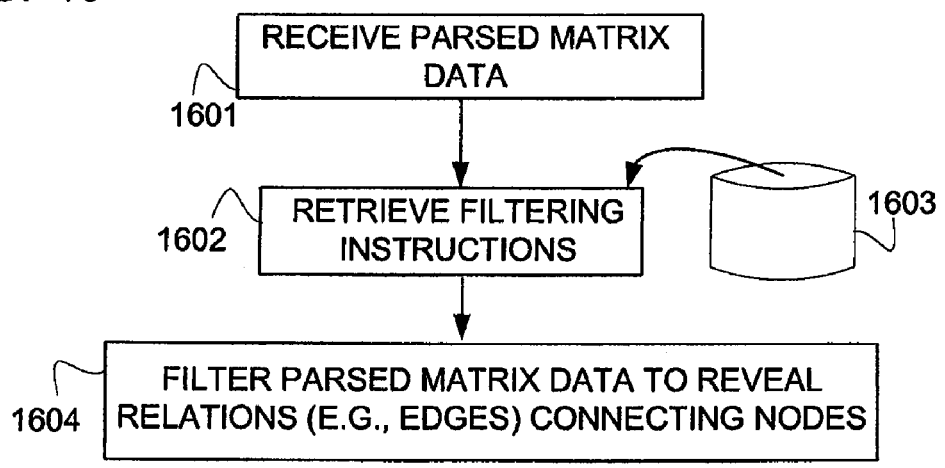
FIG. 16 is a flowchart illustrating a method, according to an example embodiment, used to execute an operation that when executed selects certain patterns.

FIG. 16 is a flowchart illustrating an example method used to execute operation 616. Shown is an operation 1601 that receives parsed matrix data. An operation 1602 may be executed that retrieves filtering instructions from, for example, filtering data 1603. These filtering instructions may instruct a further operation 1604 to filter out various edges between various nodes contained in any one of a number of graphs displayed in, for example, the reference matrix 310. An operation 1604 may be executed that filters the parsed matrix data to reveal relations in the form of edges connecting certain nodes.

Figure 17:
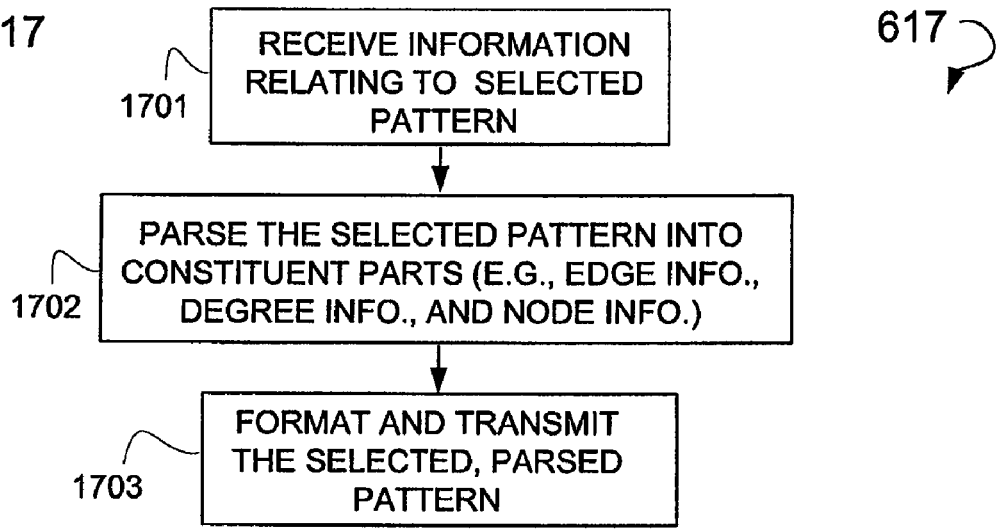
FIG. 17 is a flowchart illustrating a method, according to an example embodiment, used to execute an operation to transmit for storage the selected pattern(s) into a manual pattern database.

FIG. 17 is a flowchart illustrating an example method used to execute operation 617. Shown is an operation 1701 that receives information relating to the selected pattern. An operation 1702 may be executed that parses the selected pattern into constituent parts wherein these constituent parts may be, for example, edge information, degree information, node information, or other information indicative of describing various attributes associated with a graph. An operation 1703 may be executed that formats and transmits the selected parsed pattern.

Example Storage

Some embodiments may include the various databases (e.g., 109, 110, 113, 114, and/or 120) being relational databases, or in some cases On-Line Analytical Processing (OLAP) based databases. In the case of relational databases, various tables of data are created and data is inserted into, and/or selected from, these tables using SQL, or some other database-query language known in the art. In the case of OLAP databases, one or more multi-dimensional cubes or hypercubes containing multidimensional data from which data is selected from or inserted into using MDX may be implemented. In the case of a database using tables and SQL, a database application such as, for example, MYSQL™, SQLSERVER™, Oracle 8I™, 10G™, or some other suitable database application may be used to manage the data. In the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. These tables or cubes made up of tables, in the case of, for example, ROLAP, are organized into a RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

Figure 18:
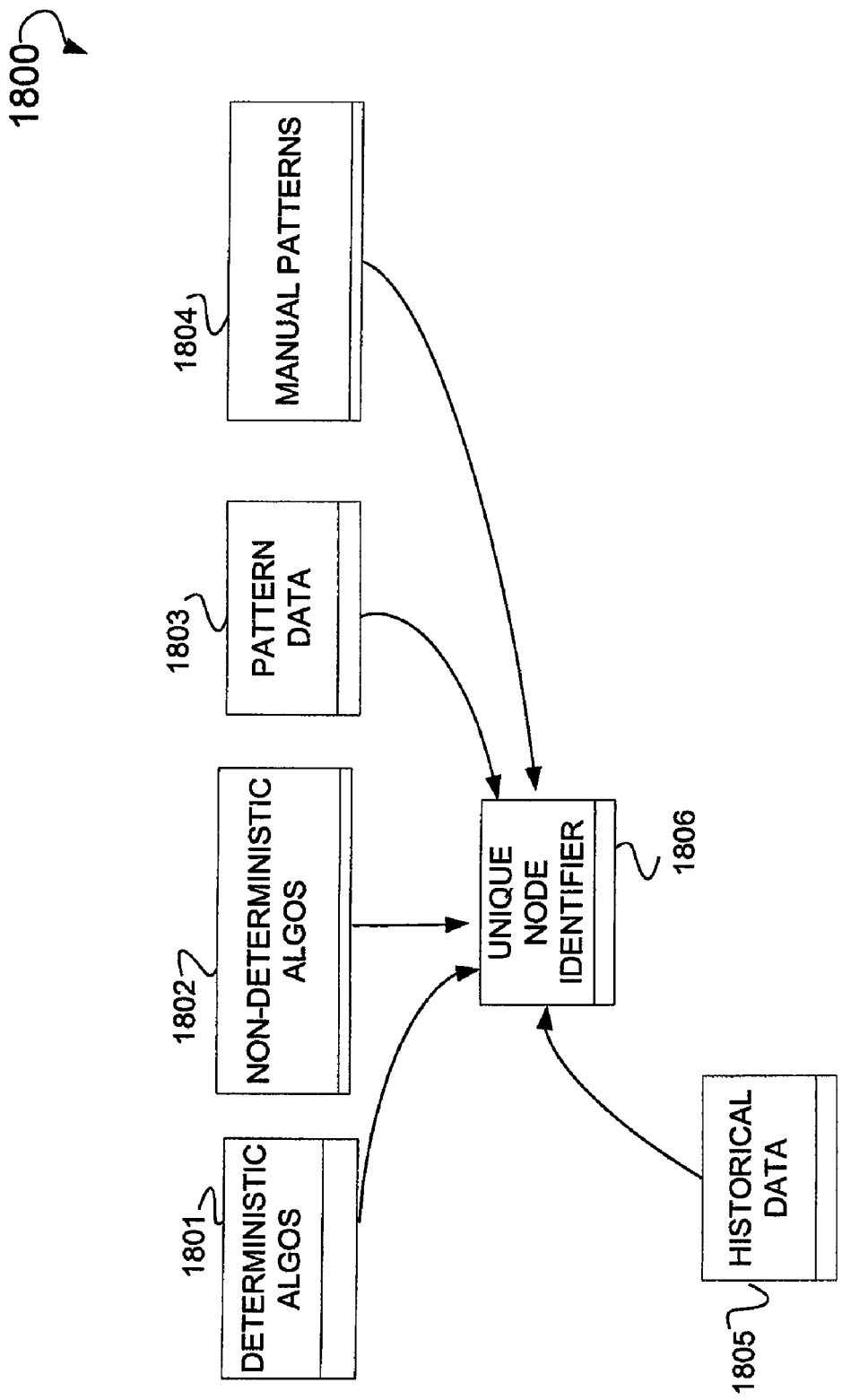
FIG. 18 is a Relational Data Schema (RDS), according to an example embodiment.

FIG. 18 is a Relational Data Schema (RDS) 1800. Contained as a part of this RDS 1800 may be any one of a number of tables. For example, table 1801 contains various deterministic algorithms where these deterministic algorithms may be, for example, a Baysian network, or some type of supervised or unsupervised or machine learning type algorithm. These deterministic algorithms may be stored utilizing some type of, for example, Binary Large Object (BLOB) formatted data, XML, or some other type of formatting regime. Table 1802 contains various non-deterministic, or stochastic, algorithms where these non-deterministic algorithms may be, for example, a genetic algorithm, a Monte Carlo algorithm, an ant algorithm, or some other type of algorithm that uses randomization in its processing and its execution. As with table 1801, these various non-deterministic algorithms may be formatted using, for example, a BLOB data type, an XML data type, or some other suitable data type. Table 1803 is also shown containing various pattern data wherein this pattern data may be formatted using, for example, XML and may describe, for example, a pattern in the form of a graph wherein this graph is composed of nodes and edges. Table 1804 is also shown containing various manual patterns where these manual patterns are patterns that are selected by, for example, a user 101 and may describe, for example, nodes and edges between nodes. Further, table 1805 is shown that contains historical data wherein this historical data may be, for example, a taxonomy of various graphs that may be used, for example, to train a neural network such as the neural network described in FIG. 14, or may be used to train some other type of deterministic or non-deterministic algorithm that may be stored in, for example, the tables 1801 or 1802. Further, a table 1806 is provided that contains unique node identifier values, wherein these unique node identifier values may be some type of integer value that is used to uniquely identify a node and/or, in some cases, a graph composed of nodes and edges. In some cases, these nodes as referenced elsewhere may relate to accounts, whereas the edges may relate to transactions or the relationships between accounts where these accounts may be sender accounts or receiver accounts or some other suitable type of accounts.

A Three-Tier Architecture

In some embodiments, a method is illustrated as implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier, and/or to a backend, or storage tier. These logical/mathematical manipulations may relate to certain business rules, or processes that govern the software application as a whole. A third tier, a storage tier, may be a persistent storage medium or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer to peer, or so some other suitable configuration. Further, these three tiers may be distributed between more than one computer system as various software components.

Component Design

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component-oriented or object-oriented programming technique can be implemented using a Visual Component Library (VCL), Component Library for Cross Platform (CLX), Java Beans (JB), Enterprise Java Beans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the OSI model or TCP/IP protocol stack model for defining the protocols used by a network to transmit data.

A System of Transmission Between a Server and Client

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

A Computer System

Figure 19:
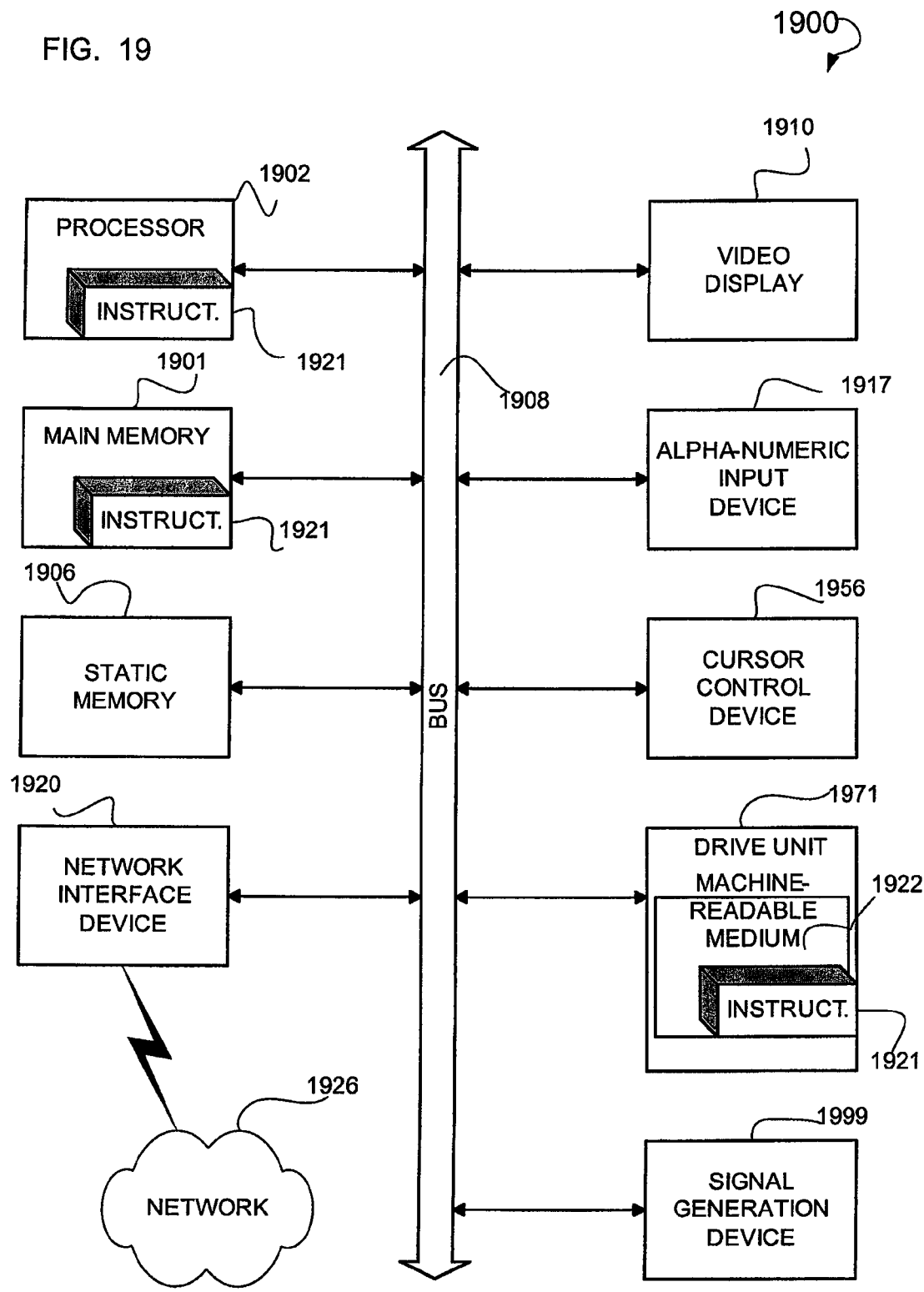
FIG. 19 shows a diagrammatic representation of a machine in the example form of a computer system, according to an example embodiment.

FIG. 19 shows a diagrammatic representation of a machine in the example form of a computer system 1900 that executes a set of instructions to perform any one or more of the methodologies discussed herein. One of the devices 102 may configured as a computer system 1900. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a High-performance computing (HPC) cluster, a vector based computer, a Beowulf cluster, or some type of suitable parallel computing cluster. In some example embodiments, the machine may be a PC. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 1900 includes a processor 1902 (e.g., a Central Processing Unit (CPU), a Graphics Processing Unit (GPU) or both), a main memory 1901, and a static memory 1906, which communicate with each other via a bus 1908. The computer system 1900 may further include a video display unit 1910 (e.g., a Liquid Crystal Display (LCD) or a Cathode Ray Tube (CRT)). The computer system 1900 also includes an alphanumeric input device 1917 (e.g., a keyboard), a GUI cursor control 1956 (e.g., a mouse), a disk drive unit 1971, a signal generation device 1999 (e.g., a speaker) and a network interface device (e.g., a transmitter) 1920.

The drive unit 1971 includes a machine-readable medium 1922 on which is stored one or more sets of instructions 1921 and data structures (e.g., software) embodying or used by any one or more of the methodologies or functions illustrated herein. The software may also reside, completely or at least partially, within the main memory 1901 and/or within the processor 1902 during execution thereof by the computer system 1900, the main memory 1901 and the processor 1902 also constituting machine-readable media.

The instructions 1921 may further be transmitted or received over a network 1926 via the network interface device 1920 using any one of a number of well-known transfer protocols (e.g., Hyper Text Transfer Protocol (HTTP), Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Marketplace Applications

In some example embodiments, a system and method is shown to facilitate network analysis. The network may be, for example, a fraud network, marketing network, or some other suitable network used to describe transactions between person in commerce. Analysis may, in some example embodiments, be performed via manual inspection by a user who compares a primary network to one or more secondary networks. Once this comparison is performed, the user may classify the primary network as being part of a classification used to describe the secondary network. In some example embodiments, the primary network may then be used as a secondary network in later classifications performed by the user.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving pattern data of a primary network that includes transaction data relating to transactions between entities;
   building, using at least one processor, at least one secondary network based on the pattern data of the primary network, the building including using an Artificial Intelligence (AI) algorithm that processes a pattern characteristic set by combining selected historical data and the pattern characteristic set based on a crossover or mutation function; and
   graphically displaying, using nodes and edges, the primary network and the at least one secondary network.

2. The method of claim 1, wherein the building comprises parsing the pattern data using a retrieved parsing grammar to generate the pattern characteristic set.

3. The method of claim 1, wherein the building comprises building an AI data structure using the AI algorithm, historical data; and the pattern characteristic set.

4. The method of claim 3, further comprising classifying the AI data structure based on a historical taxonomy.

5. The method of claim 1, wherein the building comprises applying a learning paradigm to historical data, the learning paradigm being a selection from the group consisting of supervised learning, unsupervised learning, and reinforcement learning.

6. The method of claim 1, further comprising storing the at least one secondary network into a data store as a manual pattern, the manual pattern being a stored pattern that closely corresponds to a pattern of the pattern data.

7. The method of claim 1, wherein a transaction data comprises at least one of sales transaction data or a payment transaction data.

8. A system comprising:
a processor of a machine;
a receiver to receive pattern data of a primary network that includes transaction data relating to transactions between entities;
a building engine to build, using the processor of the machine, at least one secondary network based upon the pattern data of the primary network, the building, engine to build by using an Artificial Intelligence (AI) algorithm that processes a pattern characteristic set by combining selected historical data and the pattern characteristic set based on a crossover or mutation function; and
a display component to graphically display, using nodes and edges, the pattern data of the primary network and the at least one secondary network.

9. A non-transitory machine-readable medium comprising instructions, which when implemented by one or more processors of a machine, cause the machine to perform operations comprising:
receiving pattern data of a primary network that includes transaction data relating to transactions between entities;
building at least one secondary network based on the pattern data of the primary network, the building including using an Artificial Intelligence (AI) algorithm that processes a pattern characteristic set by combining selected historical data and the pattern characteristic set based on a crossover or mutation function; and
generating a graphical display, using nodes and edges, of the pattern data of the primary network and the at least one secondary network.

10. The non-transitory machine-readable medium of claim 9, wherein the building comprises parsing the pattern data using a retrieved parsing grammar to generate the pattern characteristic set.

11. The non-transitory machine-readable medium of claim 9, wherein the building comprises building an AI data structure using the AI algorithm, historical data, and the pattern characteristic set.

12. The non-transitory machine-readable medium of claim 11, wherein the operation further comprise classifying the AI data structure based on a historical taxonomy.

13. The non-transitory machine-readable medium of claim 9, wherein the building comprises applying a learning paradigm to historical data, the learning paradigm being a selection from the group consisting of supervised learning, unsupervised learning, and reinforcement learning.

14. The non-transitory machine-readable medium of claim 9, wherein the operations further comprise storing the at least one secondary network into a data store as a manual pattern, the manual pattern being a stored pattern that closely corresponds to a pattern of the pattern data.

15. The non-transitory machine-readable medium of claim 9, wherein a transaction data comprises at least one of sales transaction data or a payment transaction data.

16. The method of claim 1, further comprising:
determining whether diversity is established based on execution of the crossover or mutation function; and
re-executing the combining of the selected historical data and the pattern characteristic set in response to a determination that diversity is not established.

17. The system of claim 8, wherein the building engine is further to:
determine whether diversity is established based on execution of the crossover or mutation function, and
re-execute the combining of the selected historical data and the pattern characteristic set in response to a determination that diversity is not established.

18. The non-transitory machine-readable medium if claim 9, wherein the operations further comprise:
determining whether diversity is established based on execution of the crossover or mutation function; and
re-executing the combining of the selected historical data and the pattern characteristic set in response to a determination that diversity is not established.

* * * * *

UNITED STATES PATENT AND TRADEMARK OFFICE
CERTIFICATE OF CORRECTION

| | | |
|---|---|---|
| PATENT NO. | : 8,341,111 B2 | Page 1 of 2 |
| APPLICATION NO. | : 13/220209 | |
| DATED | : December 25, 2012 | |
| INVENTOR(S) | : Patil et al. | |

It is certified that error appears in the above-identified patent and that said Letters Patent is hereby corrected as shown below:

On title page 2, in column 2, Item (56) under "Other Publications", line 26, delete "Received" and insert --mailed--, therefor On title page 2, in column 2, Item (56) under "Other Publications", line 36, delete "in" and insert --In--, therefor In the Drawings, On Sheet 6 of 15, Fig. 6, reference numeral 612, line 2, after "ALGOS", insert --.--, therefor On sheet 12 of 15, Fig. 14, reference numeral 1403, line 2, delete "REINFORCEMENT" and insert --REINFORCED--, therefor In the Specification, In column 3, line 51, delete "Hyper Text" and insert --HyperText--, therefor In column 3, line 52, delete "Hyper Text" and insert --HyperText--, therefor In column 5, line 63, delete "anyone" and insert --any one--, therefor In column 5, line 67, delete "to" and insert --for--, therefor In column 7, line 4, before "the", insert --from--, therefor In column 7, line 12, delete "such" and insert --, such that--, therefor Signed and Sealed this
Ninth Day of December, 2014

Michelle K. Lee
*Deputy Director of the United States Patent and Trademark Office*

CERTIFICATE OF CORRECTION (continued)
U.S. Pat. No. 8,341,111 B2

In column 7, line 14, after "generate", delete "a", therefor

In column 7, line 16, after "storage", insert --,--, therefor

In column 7, line 16-17, delete "patterns" and insert --pattern--, therefor

In column 7, line 24, delete "706" and insert --606--, therefor

In column 7, line 65, delete "including-supervised" and insert --including supervised--, therefor In column 8, line 11, delete "including-supervised" and insert --including supervised--, therefor In column 9, line 67, delete "of" and insert --on--, therefor In column 10, line 48, delete "8I™, 10G™" and insert --8i™, 10g™--, therefor In column 10, line 51, delete "On Line" and insert --Online--, therefor In column 10, line 52, delete "On Line" and insert --Online--, therefor In column 11, line 55, before "another", insert --one--, therefor In column 11, line 65, delete "so", therefor In column 13, line 15, after "may", insert --be--, therefor In column 13, line 61, delete "Hyper Text" and insert --HyperText--, therefor In the Claims, In column 14, line 58, in Claim 3, delete "data;" and insert --data,--, therefor In column 15, line 13, in Claim 8, after "building", delete ",", therefor In column 16, line 6, in Claim 12, delete "comprise" and insert --comprises--, therefor In column 16, line 34, in Claim 18, delete "if" and insert --of--, therefor